Patented Jan. 19, 1926.

1,570,583

UNITED STATES PATENT OFFICE.

ELLERY LEWIS WILSON, OF PROVIDENCE, RHODE ISLAND, ASSIGNOR TO RUMFORD CHEMICAL WORKS, OF PROVIDENCE, RHODE ISLAND, A CORPORATION OF RHODE ISLAND.

PLASTER OF PARIS AND METHOD OF MAKING THE SAME.

No Drawing.     Application filed August 22, 1924.  Serial No. 733,550.

*To all whom it may concern:*

Be it known that I, ELLERY LEWIS WILSON, a citizen of the United States, residing at Providence, Rhode Island, have invented certain new and useful Improvements in Plaster of Paris and Methods of Making the Same, of which the following is a specification.

In the preparation of plaster of Paris the characteristic step by which gypsum or calcium sulphate is transformed into its dehydrated state is generally referred to as calcination.

My invention has to do with the manufacture of plaster of Paris from either by-product or mineral sulphate of lime in its hydrous or semi-hydrous condition. By-product calcium sulphate results from reactions between calcium compounds and sulphuric acid, or by using some form of calcium salt such as the oxide, hydrate or carbonate as an agent for neutralizing excess sulphuric acid in sulphonating or other processes where neutralization of acid is essential or necessary.

The resultant of either process is a finely divided precipitate of calcium sulphate crystals, which in general practice usually occur in the hydrous form of crystallization. It has been recognized that this precipitated sulphate of lime was of considerable potential value if it could be converted into a high grade plaster of Paris by economical methods.

Up to the present time it has been impossible to secure a high grade, uniformly calcined plaster of Paris from such by-product calcium sulphate, that would pass the standard specifications of strength necessary for use in the building trade industry.

Part of this difficulty at least has been due to the physical condition of this precipitated calcium sulphate resulting from the method of its production. This generally leaves a crystalline calcium sulphate residue in a finely divided or almost unitary crystal form, having a sticky or pasty consistency, in which condition expensive methods of treatment are required in order to properly prepare it for calcination.

The calcination of hydrous calcium sulphate despite its apparent simplicity appears to have been imperfectly analyzed and comprehended. It has remained more a matter of rule of thumb operation or of judgment drawn from experience rather than a result of any scientific conception. For example, the desirability of complete and uniform calcination has been recognized but generally has been found unattainable without over-calcination of some parts of the batch. Over-calcination of any part has been recognized as undesirable but is generally only avoidable at the expense of incomplete calcination of a portion of the batch.

My invention contemplates the treatment of this precipitated calcium sulphate by the compacting of the same through a process of accretion, so as to secure the presence of a maximum number of particles in a given space, and in subsequently converting the compacted mass to an interstitially extended state in which it has a maximum of entrained air and is mechanically free for manipulation and capable of uniform heating.

For the purposes of my present disclosures however, I will discuss my procedure more particularly in connection with the utilization of by-product sulphate of lime, as such trade wastes require but slight mechanical treatment in order to change them into the required slurry form, and at the same time offer highly profitable returns from the operation.

Without going into the preliminary treatment of such by-products by which their original defects are overcome, I would point out that we may have, either as the direct result of such a process or readily obtain from any other related process, calcium sulphate in a state of slurry, as distinguished from a dry comminuted state, which is the general condition from the present practice when operating on a mineral gypsum.

In the case of such a slurry produced from a previous wet process or from an actual wet grinding of the mineral gypsum into a slurry, I concentrate the slurry preferably by mechanical manipulation, as for example, by subjecting it to the action of centrifugal force. Where this slurry occurs as a by-product there is very certain to be present certain deleterious elements of various characters which have generally a weakening effect upon the set of the plaster.

This is particularly true of slurries resulting from acid or alkaline reactions, as for example, in the production of phosphoric acid. In connection with such a manufacture it has been found by a recent independent invention not my own that it is possible to neutralize the slurry to form salts which are either nondeleterious or which may be remove with the excess water as a liquor. Such a process offers an extremely advantageous case for the application of the principles of my invention.

As pointed out above my invention contemplates a crystal accretion and I find that this can be accomplished simultaneously with the separation of the liquor by simply making that separation a violent physical expulsion as by subjecting the slurry to the action of centrifugal force. Under such force the excess moisture in the slurry may be reduced to 20% or less and at the same time the original finely divided crystalline calcium sulphate becomes densified throughout by a crystal accretion in which there seems to be an increase of specific density and a rearrangement and compacting or consolidation of crystals or groups of crystals into larger groups. This produces a very discernible change in some of the physical characteristics of the resultant plaster of Paris.

Calcium sulphate crystals in the usual slurry usually appear in a highly attenuated form. Under centrifugal action these crystals or crystal groups become augmented by accretion or by the twinning action characteristic of this mineral. Under magnification these crystals or crystal groups, densified or compacted by pressure as heretofore described, show a characteristic crystalline accretion in which the augmentation of the crystals as well as the twinning and interlacing of the crystal mass is quite apparent. In other words, the pressure causes the crystals to coalesce and while the exact reason for the physical change which takes place is difficult of statement, it would seem that the remarkable crystalline accretion which characterizes my product is due to a possible softening of the surface of the crystals by the compressive action on its water of crystallization by which its surface may bond to the surfaces of adjacent crystals, which double bonding and twinning becomes permanent upon release of the pressure.

As suggested above, calcium sulphate containing approximately 20% free water is apt to have a sticky or pasty consistency which makes it inconvenient or commercially impracticable to handle, especially in such a process as calcination. Being in itself a poor conductor of heat calcination has usually been effected only by strenuous mechanical stirring but even with such stirring the calcium sulphate in its usual form has been resistant to uniform heating. This has resulted in under-calcination of part of the charge and over-calcination or burning of other parts, both of which materially reduce the strength of the resultant plaster.

I therefore take the calcium sulphate after the expulsion of the liquor and convert it into a non-compacted interstitially extended state in which it will have a considerable amount of air. I preferably accomplish this by a shaving or crumbling action in which the mass is reduced to a state in which the mass is so extended that every portion is exposed to the air. In such a state the material handles freely without clogging or compacting. Thus in the calcining kettle it not only stirs freely but has initially so much air within its mass that heat is readily conducted throughout thus making possible the greatest uniformity in the calcining operation.

It is for this reason that by-product calcium sulphate when fed into the calcining kettles in this extended state in accordance with my invention can be converted into highly uniform plaster of Paris of excellent crystallizing qualities as is evidenced by a considerable increase in ultimate strength. In some cases this increase in strength is as high as 50% over the same raw material treated after the old manner of preliminary drying before calcination.

My invention is capable of being variously practiced as to steps and features which may be employed singly or variously combined in commercial processes. My invention is also capable of practice with various apparatus all without departing from the spirit of my invention, but I have found that the use of centrifugal force as a means of mechanical expulsion, (of excess liquor or water,) as applied in the centrifugal machine, produces a cake well adapted to the mechanical conversion to a non-compacted state, and in fact such a cake may be shaved from the machine so that the material is delivered ready for the calcining kettles, thus eliminating the drying process necessary in present methods of calcination. In discussing and claiming my invention I have been obliged to use certain terms to specify physical changes in the calcium sulphate, and in the plaster. Such terms as "crystalline accretion" or "augmentation", "coalescense" and "regelation" are terms employed by the authorities to describe the changes pointed out. In so far they may at present be interpreted as involving some theory of crystallography, I do not feel that I should be limited by theory, as theories are subject to change.

I have discussed my invention particularly with reference to calcium sulphate and plaster of Paris although some steps in my invention may doubtless be found useful in other processes and in the production of other materials. All such is to be considered as within the scope of my invention if within the limits of the appended claims.

What I therefore claim and desire to secure by Letters Patent is:

1. In the production of plaster of Paris from precipitated calcium sulphate, that step which consists in effecting crystalline accretion by subjecting the material to pressure to cause coalescence of the crystals.

2. In the production of plaster of Paris from finely divided precipitated gypsum, that step which consists in effecting twinning of the finer individual crystals into agglomerated crystal groups through pressure.

3. The process of producing plaster of Paris from precipitated gypsum, which consists in effecting crystalline accretion of the crystals so that they will coalesce, in converting the coalesced crystals into a non-compacted, interstitially extended mass upon release of the pressure, and in uniformly calcining the extended mass.

4. The process of producing plaster of Paris from precipitated gypsum, which consists in effecting crystalline accretion by subjecting the material to pressure to cause the crystals to coalesce, in converting the coalesce crystals into a non-compacted, interstitially extended mass, and in uniformly calcining the extended mass.

5. As a new material of increased tensile strength for use in the manufacture of plaster of Paris, precipitated calcium sulphate characterized by a compacting of its finer individual crystals into agglomerated crystal groups.

In testimony whereof I affix my signature.

ELLERY LEWIS WILSON.